United States Patent [19]    [11] Patent Number: 5,443,335
Shimano et al.                    [45] Date of Patent: Aug. 22, 1995

[54] CUTTING INSERT

[75] Inventors: Takamasa Shimano; Tatsuo Arai; Takayoshi Saito, all of Ibaragi, Japan

[73] Assignee: Mitsubishi Materials Corp., Tokyo, Japan

[21] Appl. No.: 187,283

[22] Filed: Jan. 27, 1994

[30] Foreign Application Priority Data

Feb. 1, 1993 [JP] Japan ................... 5-014973

[51] Int. Cl.⁶ .................................. B23C 5/06
[52] U.S. Cl. ............................. 407/113; 407/42
[58] Field of Search ................ 407/42, 113, 114

[56] References Cited

U.S. PATENT DOCUMENTS

| | | | |
|---|---|---|---|
| 4,090,801 | 5/1978 | Faber | 407/113 |
| 4,585,375 | 4/1986 | Erkfritz | 407/113 |
| 4,699,549 | 10/1987 | Shimomura et al. | 407/113 |
| 4,834,591 | 5/1989 | Tsujimura et al. | 407/113 |
| 4,934,878 | 6/1990 | Plutschuck et al. | 407/113 |
| 5,145,294 | 9/1992 | Flueckiger | 407/113 |
| 5,244,318 | 9/1993 | Arai et al. | 407/113 |
| 5,314,269 | 5/1994 | Arai et al. | 407/113 |

Primary Examiner—Jack W. Lavinder
Attorney, Agent, or Firm—Armstrong, Westerman, Hattori, McLeland & Naughton

[57] ABSTRACT

The invention relates to a cutting insert. The cutting insert has a polygonal tabular body having a main cutting edge and a sub-cutting edge. A rake surface connected to the main cutting edge and the sub-cutting edge is composed of a plurality of consecutive component surfaces so as to present a multi-face surface which is curved and convex along the circumference of the body. The consecutive component surfaces are demarcated from adjacent component surfaces by edges lines $L_1$, $L_2$ which at their one end reach the main cutting edge. The intersection angles at which the component surfaces intersect the end surface connected to the main cutting edge are so varied in a stepped manner that the intersection angle of the component surface most remote from the nose portion is the smallest. The third component surface is curved along the circumference of the body so as to be convex outward, so that the portion of the main cutting edge associated with this component surface is also curved to be convex outward.

7 Claims, 6 Drawing Sheets

CUTTING INSERT

BACKGROUND OF THE INVENTION

The present invention relates to a cutting insert for use on a cutting tool such as a face milling cutter or other types of cutters.

An example of a conventionally used cutting insert is disclosed in Japanese Patent Laid-Open No. 53-101792.

Figure 1:
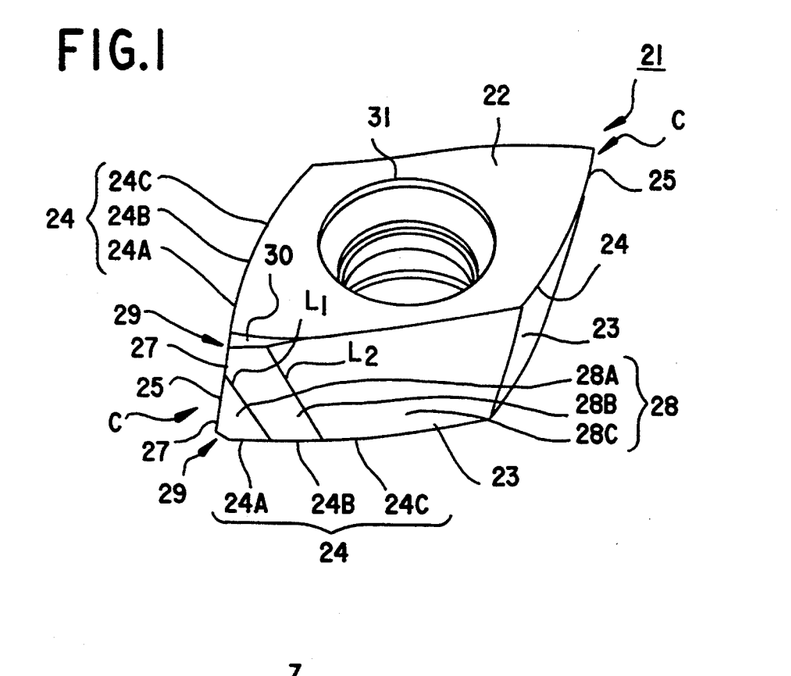
FIG. 1 is a perspective of an embodiment of the cutting insert in accordance with present invention.
Figure 2:
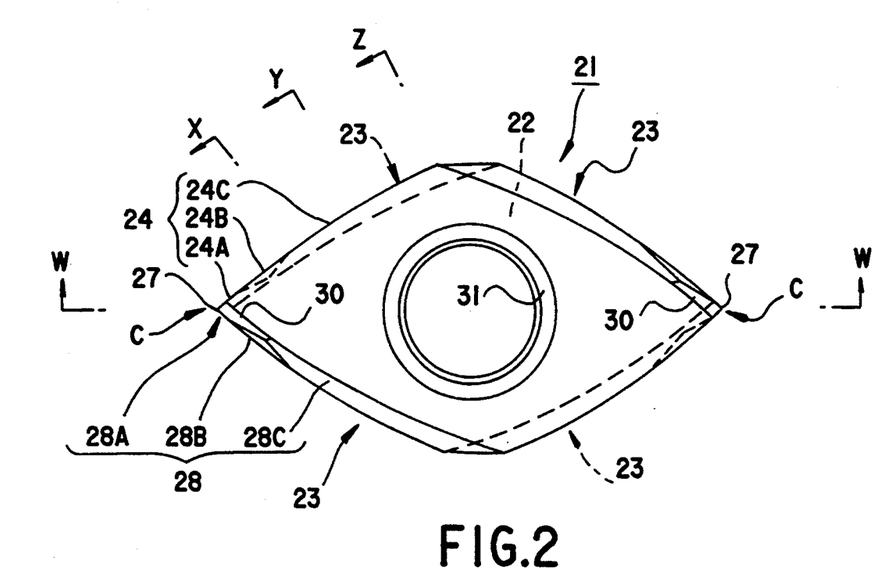
FIG. 2 is a plan view of the embodiment of FIG. 1 as viewed in the direction perpendicular to an end surface 22, i.e., in the direction of thickness of the cutting insert.
Figure 3:
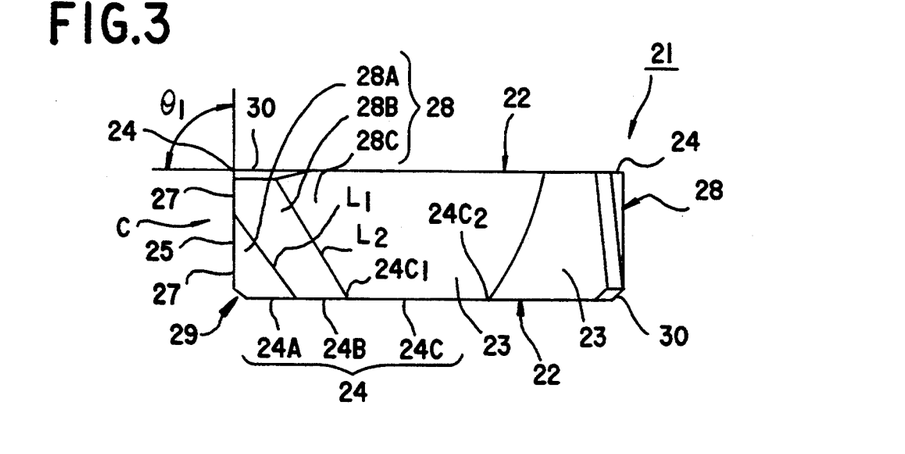
FIG. 3 is a side elevational view of the embodiment shown in FIG. 1, as viewed in a direction facing one side surface 23 of the cutting insert.
Figure 4:
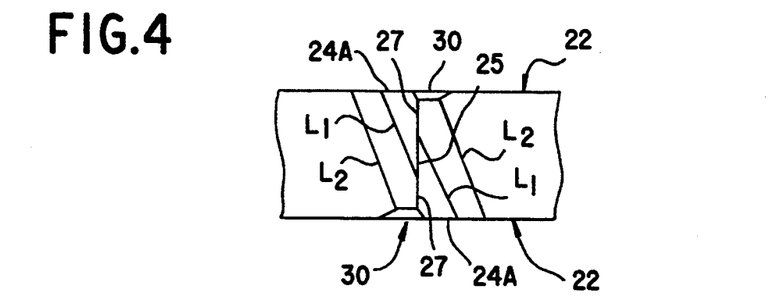
FIG. 4 is a side elevational view of the embodiment shown in FIG. 1 as viewed in a direction facing an acute angle corner C.
Figure 5:
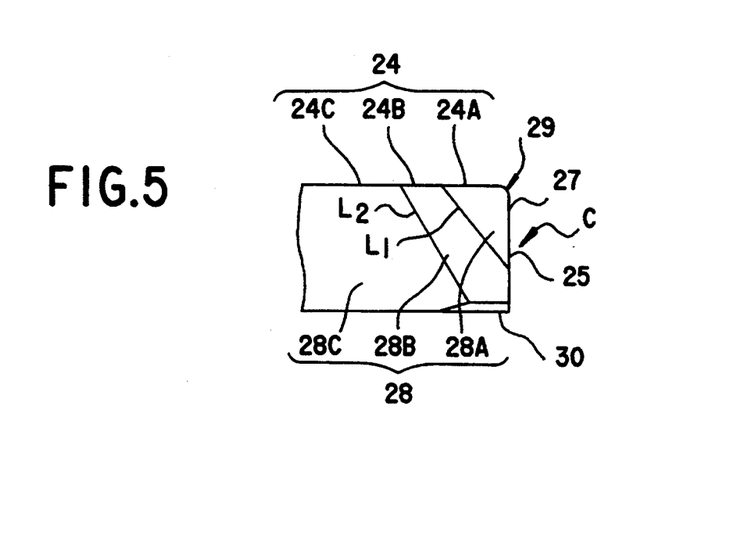
FIG. 5 is a side elevational view of the embodiment shown in FIG. 1, as viewed in a direction facing the other side surface 23.
Figure 6:
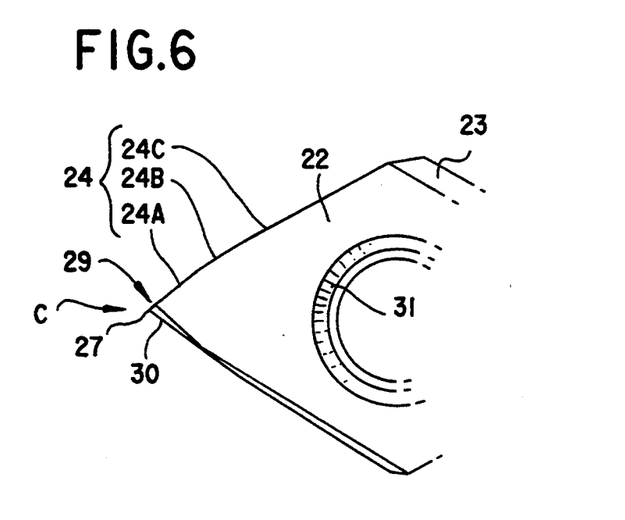
FIG. 6 is a plan view of the embodiment shown in FIG. 1 as viewed in a direction in which a sub-cutting edge 27 extends.
Figure 7:
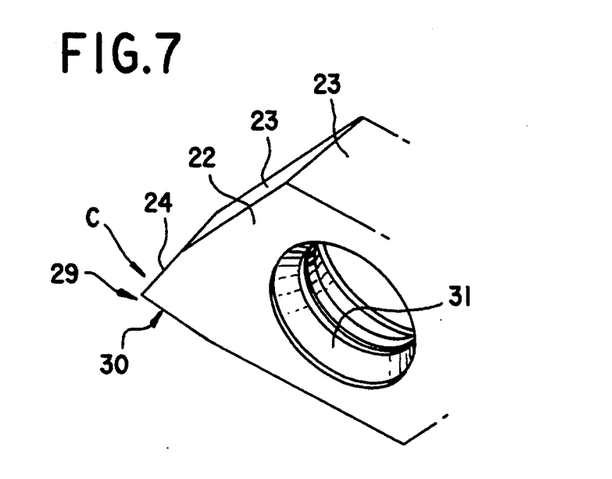
FIG. 7 is a plan view of the embodiment shown in FIG. 1 as viewed in the direction in which a chamfered portion 30 extends.
Figure 8:
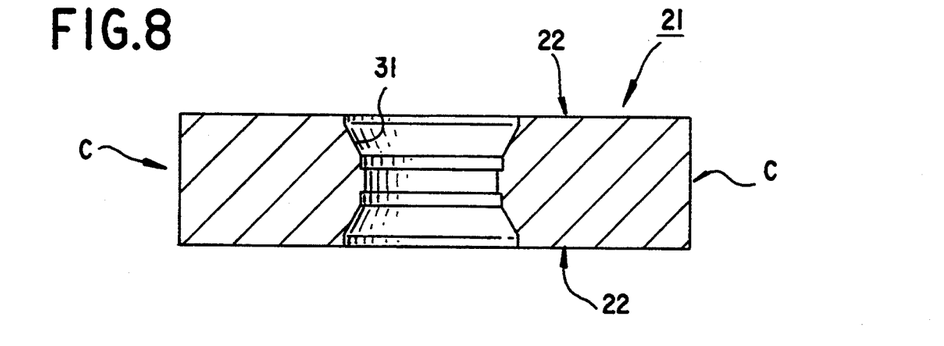
FIG. 8 is a sectional view taken along the line WW of FIG. 2.
Figure 9:
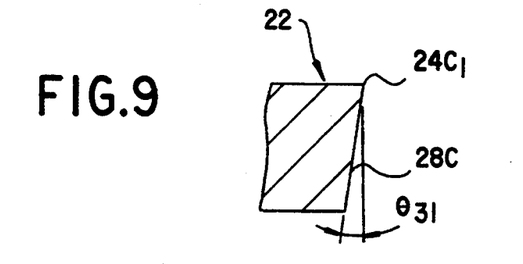
FIG. 9 is a sectional view taken along the line XX of FIG. 2.
Figure 10:
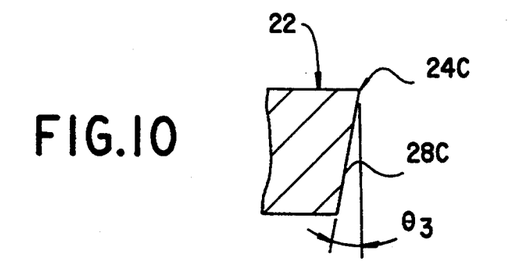
FIG. 10 is a sectional view taken along the line YY of FIG. 2.
Figure 11:
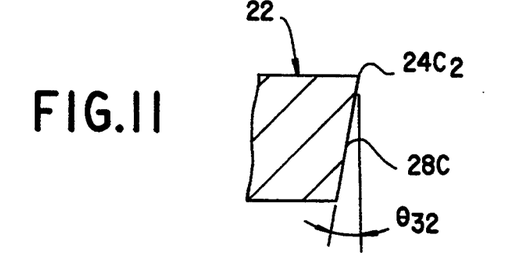
FIG. 11 is a sectional view taken along the line ZZ of FIG. 2.
Figure 12:
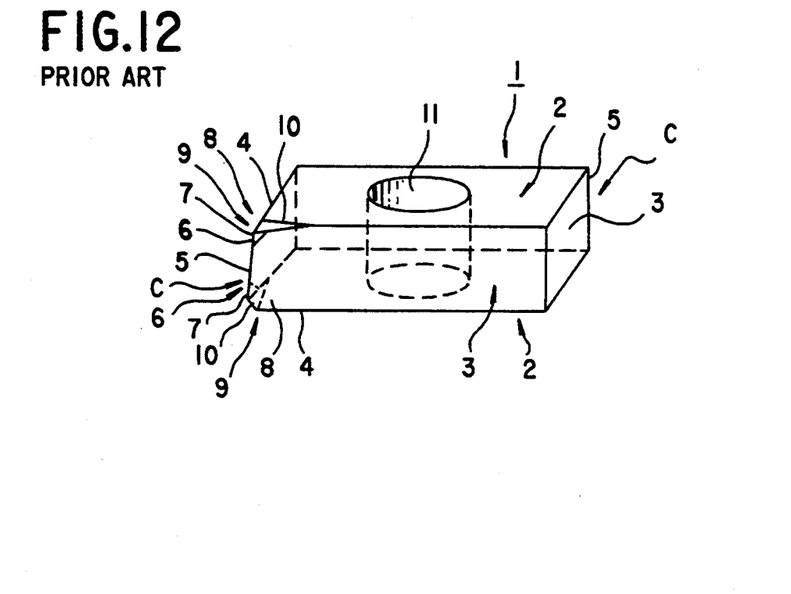
FIG. 12 is a perspective view of a known cutting insert.
Figure 13:
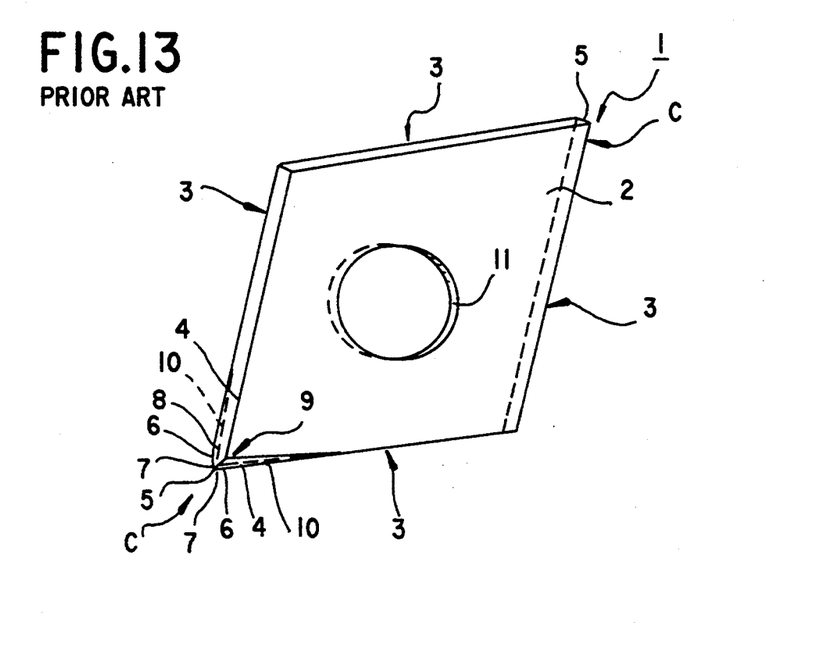
FIG. 13 is a plan view of the known cutting insert shown in FIG. 12 as viewed in a direction facing an end surface 2.
Figure 14:
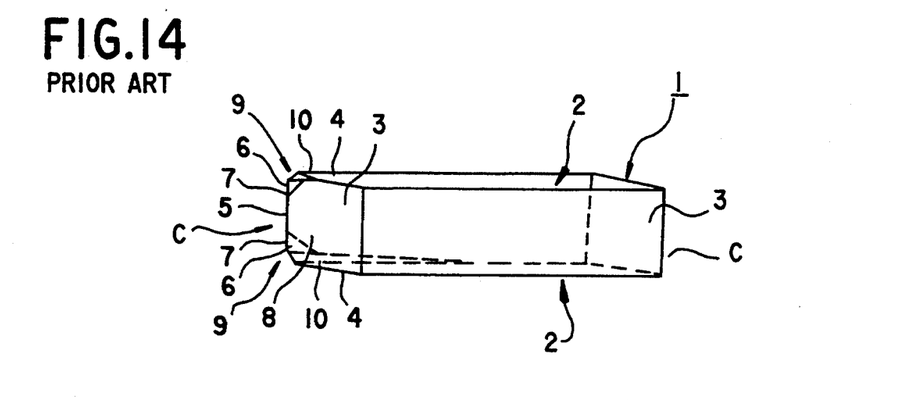
FIG. 14 is a side elevational view of the known cutting insert shown in FIG. 12, as viewed in a direction facing a side surface 3.

Such a cutting insert is adapted for use on a vertical-edge type cutting tool. As shown in FIGS. 12 to 14, the cutting insert has a body 1 of a generally diamond-shaped tabular form having two end surfaces 2, 2 which oppose each other across the thickness of the tabular form. Four side or peripheral surfaces 3 are perpendicular to the end surfaces 2, 2. Main cutting edges 4 are formed on four peripheral edges of alternate end surfaces as viewed in the circumferential direction of the body 1, among the peripheral edges where both end surfaces 2,2 meet the respective side surfaces 3.

Numeral 5 denotes corner edges formed by two adjacent side surfaces 3,3 at the acute angle corners C, C of the body 1 of the cutting insert. A tapered surface 6 is formed at a corner of the side surface 3 which is defined by each edge 5 and the adjacent peripheral edge which does not form the main cutting edge 4. The width of the tapered surface 6 progressively increases towards the corner edge 5. The edge or side of tapered surface 6 merging in the associated corner edge 5 presents a sub-cutting edge 7 which is connected to the main cutting edge 4 forming an obtuse angle therebetween. A rake surface 8 is presented by the side surface 3 which is designed on one hand by the corner edge 5 associated with the sub-cutting edge 7 and on the other hand by the peripheral edge where the main cutting edge 4, in such manner that the rake surface 8 is connected to the main cutting edge 4 and the sub-cutting edge 7.

Numeral 9 designates a nose portion formed in the region where the main cutting edge 4 and the sub-cutting edge 7 merge with each other. Numeral 10 denotes a chamfered portion formed along the peripheral edges of the body 1 where the main cutting edges 4 are not formed, while 11 designates a mounting hole for receiving a clamp screw by means of which the body 1 of the cutting insert is mounted on, for example, a face milling cutter.

Figure 15:
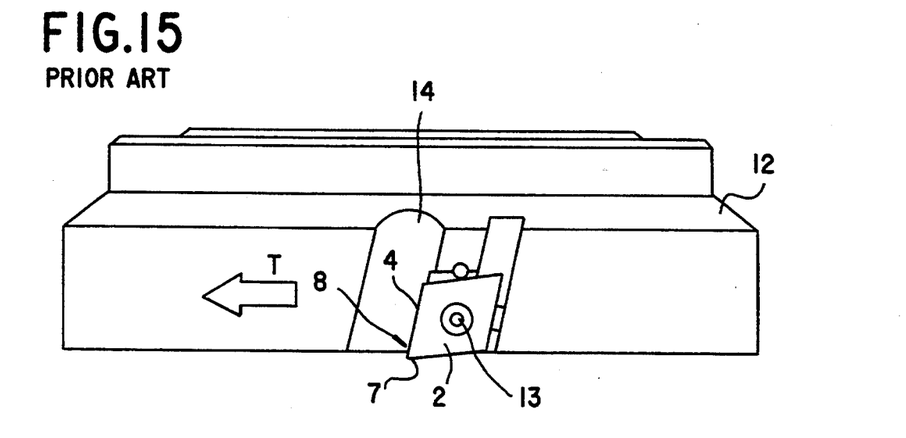
FIG. 15 is a side elevational view of a face milling cutter mounting the known cutting insert shown in FIG. 12.

More specifically, the cutting insert is mounted on the outer peripheral portion of an end of a face milling cutter 12 shown in FIG. 15, such that one of the end surfaces 2, 2 is directed outwardly of the cutter, with one of the main cutting edges 4 on this end surface 2 projecting outward from the end of the cutter 12, as well as the sub-cutting edge 7 associated with main cutting edge 4. In this state, the body 1 of the cutting insert is fixed by the clamp screw to the cutter 12 so as to be subjected to cutting operation. The cutting insert, when used on the cutter, is so oriented that the above-mentioned rake surface 8, connected to the main cutting edge 4 and the sub-cutting edge 7, is directed forwardly as viewed in the direction of rotation of the cutter which is indicated by white-blank arrow T, shown in FIG. 15. More particularly, the rake surface 8 is a negative rake surface which orthogonally intersects the end surface 2 connected to the above-mentioned main cutting edge 4. This end surface 2 presents a relief surface connected to the above-mentioned main cutting edge 4. At the same time, the tapered surface 3 formed on the side surface 3 directed to the end of the cutter 12 presents a relief surface outward from the end of the cutter 12, as well as the sub-cutting edge 7 associated with main cutting edge 4.

In this state, the body 1 of the cutting insert is fixed by the clamp screw to the cutter 12 so as to be subjected to cutting operation. The cutting insert, when used on the cutter, is so oriented that the above-mentioned rake surface 8, connected to the main cutting edge 4 and the sub-cutting edge 7, is directed forwardly as viewed in the direction of the rotation of the cutter which is indicated by white-blank arrow T, shown in FIG. 15. More particularly, the rake surface 8 is a negative rake surface which orthogonally intersects the end surface 2 connected to the above-mentioned main cutting edge 4. This end surface 2 presents a relief surface connected to the above-mentioned main cutting edge 4. At the same time, the tapered surface 3 formed on the side surface 3 directed to the end of the cutter 12 presents a relief surface which is connected to the above-mentioned sub-cutting edge 7.

In these Figures, a reference numeral 14 designates a tip pocket which is formed in a portion of the outer peripheral surface of the cutter 12 which is ahead of the rake surface 8 of the cutting insert as viewed in the direction of the rotation.

As stated before, this known cutting insert has a diamond-shaped tabular body 1 which is provided with cutting edges 4 on the peripheral edges of the alternate end surfaces 2, and sub-cutting edges 7 are formed so as to be connected to the main cutting edges 4 along the corner edges 5 between the adjacent peripheral surfaces 3, 3 intersecting at both acute corners C, C of the body 1. Therefore, by turning the body 1 through 180° from the illustrated position or by reversing the same, such that the other end surface 2 is exposed, it is possible to use the cutting insert in four different postures, one after another.

It has been known that, in this type of cutting insert, the cutting resistance imposed on the main cutting edge 4 is effectively reduced to improve the cutting performance, by setting large positive axial and radial rake angles of the main cutting edge 4 in the mounted state of the cutting insert.

However, in the known cutting insert of the type described, the peripheral surface 3, on which the rake surface 8 of the main cutting edge 4 is formed, is a planar surface which orthogonally intersects the end surface 2 associated with the main cutting edge 4, over the entire length of the peripheral edge of the end surface 2. Therefore, in order to obtain a large axial rake angle of the main cutting edge 4 while preserving the relief of the sub-cutting edge 5, the apex angle at the acute angle corners C, C, i.e., the angle at which the side surfaces 3, 3; 3, 3 forming the respective corners C, C, is set to a considerably small value. Such a reduced acute angle causes the body 1 of the cutting insert to have a flattened diamond shape, with the result that the nose angle of the sub-cutting edge 7 is reduced, so that the strength of the cutting edge is impaired, thus allowing a problem to occur, such as breakdown.

On the other hand, a cutting insert also has been known in which, in order to preserve a large radial rake angle of the main cutting edge 4, the body 1 of the cutting insert is so designed that the end surface 2 adjacent to this main cutting edge 4 and the side surface 3 intersect at an angle which is below 90°, so that the rake surface 8 connected to this main cutting edge 4 is formed as a positive rake surface which intersects the above-mentioned end surface 2 at an acute angle. In this type of cutting insert, however, the nose angle of the main cutting edge 4 is reduced, so that the strength of the main cutting edge is reduced, thus posing the risk of breakdown of the main cutting edge.

In particular, the above-mentioned risk of breakdown of the cutting edge is critical in the case where the cutting insert is used on a face milling cutter described above, because in such a case the cutting insert receives the greatest load at its cutting edge which is projected beyond the end of the cutter 12.

If the mounting of the cutting insert on the face milling cutter 12 is conducted in such a manner as to impart a positive axial rake angle to the main cutting edge 4 while giving an outer peripheral relief angle to the end surface 2 directed to the outside of the cutter 12 as shown in FIG. 15, the distance between the axis of rotation the cutter 12 and the main cutting edge 4 varies according to the portions of the cutting edge 4, so that both ends of the main cutting edge 4 slightly project radially outward of the cutter 12 as compared with the central portion of the main cutting edge 4. Consequently, the locus of the main cutting edge 4 formed when the cutter 22 rotates is not truly cylindrical but is slightly constricted at the center. As a consequence, the finish precision of the surface cut by the face milling cutter is impaired.

Since the amount of projection of both ends of the main cutting edge 4, outward from the cutter 12, is different from that of the central portion of the main cutting edge 4, different levels of load are applied to both ends and the central portion of the main cutting edge 4. In the operation of the face milling cutter having the described cutting insert, the metal chips formed as a result of the cutting performed by the main cutting edge 4 are caused to slide on the rake surface 8 formed on the side surface of the body 1 of the cutting insert and is received in the aforementioned tip pocket 14 so as to be discharged therefrom.

However, in the known cutting insert, the main cutting edge is essentially straight because it is formed along the peripheral edge formed between the end surface 2 and the side surface 3, both of which are planar. Consequently, the cut chips of the metal also are liable to have a wide web-like form with a large curling radius, tending to cause a jam or clog with the cut metal chips. Such a web-like cut metal chip is hardly separable from the planar rake surface 8 along which the metal chip advances is tight contact therewith. This promotes the wear of the rake surface 8 and enhances the cutting resistance.

SUMMARY OF THE INVENTION

The present invention has been accomplished to obviate the above-described problems of the known arts.

According to the present invention, there is provided a cutting insert comprising a polygonal tabular body having two opposing end surfaces (in the thicknesswise direction) and side surfaces interconnecting and surrounding the end surfaces, at least one of the peripheral edges defining the end surfaces being formed to have a main cutting edge, the corner edge line of the body, at which two adjacent side surfaces intersect each other and which intersects the peripheral edge where the main cutting edge is formed, has a sub-cutting edge connected to the main cutting edge so as to form a nose portion therebetween, the side surface defined by the corner edge line where the sub-cutting edge is formed and the ridge line where the main cutting edge is formed presenting a rake surface, wherein the improvement comprises that the rake surface is composed of a plurality of consecutive component surfaces demarcated by ridge lines which at their one ends reach the main cutting edge, so as to present a multi-face surfaced which is curved along the circumference of the body so as to be convex outward, the intersection angles at which the component surfaces intersect the end surface having the main cutting edge being so varied in a stepped manner that the component surface remotest from the nose portion having the smallest intersection angle and the component surface closest to the nose portion having the greatest intersection angle, and at least one of the component surfaces being curved along the circumference of the body so as to be convex outward.

In the cutting insert having the construction described above, the rake surface presented by a side surface of the body of the cutting insert is composed of a plurality of consecutive component surfaces so as to present a multi-face surface which is curved along the circumference of the body to be convex outward. Consequently, the main cutting edge connected to this rake surface also is curved along the circumference of the body so as to be convex outward. This cutting insert is mounted to a cutting tool such as a face milling cutter is such a manner that the side surface presenting a multi-face rake surface is directed forwardly as viewed in the direction of the tool rotation with the main cutting edge positioned on the outer peripheral end of the cutting tool. In such a state, the axial angle of the main cutting edge increases towards the positive side in a stepped manner, from the end adjacent to the end of the tool body, towards the end adjacent to the base end of the tool.

In addition, since at least one of the component surfaces is curved in the circumferential direction to be convexed outward, the axial rake angle of the portion of the main cutting edge associated with this component surface progressively increases towards the base end.

The intersection angles at which the component surfaces intersect the end surface having the main cutting edge are varied in a stepped manner so that the component surface most remote from the nose portion has the smallest intersection angle and the component surface closest to the nose portion has the greatest intersection angle. Therefore, in the mounted state of the cutting insert, the radial rake angle of the main cutting edge also is increased toward the positive side in a stepped manner from the end adjacent to the end of the cutting tool towards the end adjacent to the base end of the cutting tool.

Consequently, both the axial and radial rake angles of the main cutting edge are small at the end adjacent to the end of the cutting tool where specifically large loads are applied to the main cutting edge. Therefore, provided that the relief angle is constant, the nose angles of the main cutting edge and the sub-cutting edge can be set to large values, thus providing sufficient strength of the cutting edges. On the other hand, the axial and radial rake angles are set to greater positive values at the end of the main cutting edge adjacent to the base end of the cutting tool than at the end adjacent to the outer end of the cutting tool, so that the cutting resistance is reduced in order to improve the cutting effect of the main cutting edge.

In the cutting insert having the described construction, the main cutting edge is curved to be convex outward. Therefore, when this cutting insert is mounted to a cutting tool such that a positive axial rake angle is imparted to the main cutting edge, and the central portion of the main cutting edge is positioned at the leading side of the straight line interconnecting both ends of the main cutting edge as viewed in the tool rotation direction tangential to the locus of rotation of the main cutting edge, so as to project radially outward of the tool body.

This cancels the above-mentioned radially outward projection of both ends of the main cutting edge relative to the central portion of the same. This cutting insert, therefore, provides a locus of rotation of the main cutting edge which more closely approximates a true cylindrical form, thus offering a higher degree of precision of the finished surface. At the same time, the load applied to the main cutting edge is uniformly distributed over the entire length of the main cutting edge, thus suppressing any tendency of local wear of the main cutting edge.

The main cutting edge is curved in multiple steps and thus produces an effect that the metal chips are curved in the breadthwise direction thereof when cut from the work by the main cutting edge. Furthermore, the rake surface also is curved in order to convex outward because it is formed of a plurality of consecutive component surfaces. Therefore, the cut metal chip which has rubbed and passed one component surface of the rake surface is separated from the rake surface when moved to the subsequent component surface. Moreover, since at least one of the component surfaces in curved to be convex outward, the cut metal chip, cut by the main cutting edge portion connected to this component surface, comes off the component surface as it moves along the latter so as to be discharged.

In addition, since the cut metal chip when generated is curled while being curved in the widthwise direction, the area of contact between the rake surface and the cut metal chip is reduced (with the result being that the separation of the cut metal chips), from the rake surface is promoted to suppress wear of the rake surface, as well as any increasing tendency of cutting resistance.

DETAILED DESCRIPTION OF THE PREFERRED EMBODIMENT

FIGS. 1 to 11 show an embodiment of the present invention.

Referring to these Figures, a body 21 of the cutting insert is made of a hard material such as a hard alloy and has a generally diamond-shaped tabular form. Thus, the body 21 of the cutting inset has two opposing end surfaces 22, 22 (in the direction of thickness of the tabular form) and four side walls 23, 23, 23, 23 which extend in the direction of the thickness of the tabular form and which are arranged around the end surfaces 22, 22. Thus, eight peripheral edges are presented by the pair of end surfaces 22, 22, among which four peripheral edges associated with the opposing end surfaces 22, 22 as viewed in the circumferential direction of the body 21 present main cutting edges 24.

The four side surfaces 23, 23, 23, 23 are grouped into two groups. Each group includes two side surfaces which cross each other at an acute angle along a line 25 which provides each acute angle corner C. Sub-cutting edges 27, 27 are formed to extend from both ends of each acute angle corner edge line 25 inwardly as viewed in the direction of thickness so as to be connected to the main cutting edges 24 which intersect this edge line 25. Each of two side surfaces 23, 23 which meet each other at this edge line 25 provides a rake surface 28 which is connected to the main cutting edge 24 and the sub-cutting edge which is formed along the edges of this side surface 23. The corner or edge of the rake surface 28, where the main cutting edge 24 and the sub-cutting edge 27 meet each other, forms a nose portion 29.

In this embodiment, each rake surface 28 is constituted by three component surfaces arranged such that one end of the ridge line along which two adjacent component surfaces merge in each other reaches the main cutting edge 24. Thus, the rake surface 28 is a polygonal or multi-staged (three stages in this embodiment) surface which is convex outward along the circumference of the body 21 of the cutting insert. Consequently, the main cutting edge 24 connected to the rake surface 28 is staged or divided into three sections: namely, a first main cutting edge section 24A adjacent to the nose portion 29, an intermediate second main cutting edge section 24B and a third main cutting edge section 24C. Thus, the whole main cutting edge 24 is curved twice so as to be convex outward.

The component surfaces of the rake surface also will be referred to as a first component surface adjacent to the nose portion 29, an intermediate second component surface 28B and a third component surface 28C, respectively. The component surfaces 28A, 28B and 28C have such different areas that the component surface 28C remotest from the nose portion 29 has the greatest area and the component surface 28A closest to the nose portion 29 has the smallest area. Thus, the third component area 28C occupies the greatest portion of the whole area of the rake surface 28. Consequently, the third main cutting edge section 24C connected to the third component surface 28C occupies the greatest portion the whole length of the main cutting edge 24.

In this embodiment, the third component surface 28C is curved along the periphery of the body 21 of the cutting insert so as to be convex outward. As a result, the third main cutting edge section 24C connected to this component surface 28C also is curved along the periphery of the body 21 of the cutting insert so as to be convex outward. The first and second component surfaces 28A, 28B are flat and, therefore, the main cutting edge sections 24A, 24B associated with these component surfaces are straight.

The arrangement is such that the angle $\phi$ at which the main rake surface 28 meets the end surface 24 along the main cutting edge 24 varies according to the distance from the nose portion 29. Namely, the angle $\phi$ is the smallest for the component surface 28C remotest from the nose portion 29. For instance, in the illustrated embodiment, the angle $\phi_1$ formed between the end surface 22 and the first component surface 28A is set to be 90° while the angle $\phi_2$ at which the second component surface 28B meets the end surface 22 is set to be 3°. Thus, the first component surface 28A forms a negative rake surface which orthogonally intersects or meet the end surface 22, while the second and third component surfaces 28B, 28C provide positive rake surfaces which intersects the end surface 22 at acute angles.

Furthermore, the third component surface 28C is so formed that the angle $\phi_3$ of intersection between the end surface 22 and the third component surface 28C progressively decreases from the value $\phi_{31}$ to $\phi_{32}$ along the third main cutting edge section 24C from the end $24C_1$ thereof adjacent the nose portion 29 to the end $24c_2$ remoter from the nose portion 29. (See FIGS. 9 to 11.)

For instance, in the illustrated embodiment, the angle $\phi_{31}$ of intersection between the third component surface 28C and the end surface 22 is set to be 7° at the end $24C_1$ of the third main cutting edge section 24C adjacent to the nose portion 29, whereas the angle $0_{32}$ of intersection between the third component surface 28C and the end surface 22 is set to be 11° at the end $24C_2$ of the third main cutting edge section 24C more remote from the nose portion 29.

The ridge, i.e. edge, line at which the first component surface 28A and the second component surface 28B meet each other will be referred to as a fist ridge line $L_1$, and the ridge, i.e. edge, line at which the second and third component surfaces 28B and 28C meet each other is referred to as a second ridge line $L_2$. The other end, i.e., the end opposite to the main cutting edge 24, of the first ridge line $L_1$ is extended to reach the corner edge line 25 on which the sub-cutting edge 27 is formed. The other end of the second ridge line $L_2$ is extended to reach the peripheral edge of the side surface 23 opposite to the peripheral edge on which the main cutting edge 24 is formed, i.e., to the peripheral edge of the end surface 22 which is opposite to the end surface 22 along which the main cutting edge 24 is formed.

More specifically, the other end of the first ridge line L1 extends to cross the above-mentioned corner edge line 25 at a point which is about $\frac{2}{3}$ the whole thickness of the cutting insert, i.e., the whole length of the corner edge line, as measured from the nose portion 29. Thus, the central portion of the corner edge line 25 is commonly connected to the pair of first component surfaces 28A, 28A. Since both first component surfaces 28A, 28A are negative rake surfaces, the above-mentioned central portion of the corner edge line 25 extends perpendicularly to both end surfaces 22, 22 of the body 21 of the cutting insert.

In the illustrated embodiment, the sub-cutting edges 27 extend from the nose portions 29, 29 on both ends of the corner edge line 25 inwardly as viewed in the thicknesswise direction to both ends of the above-mentioned central portion of the corner edge line 25.

Thus, the rake surfaces 28, 28 of two side surfaces 23, 23 which cross at each acute corner of the body of the cutting insert are arranged such that the other end of the first ridge line L1 formed on one of the two rake surfaces coincides with the thicknesswise inner end of the sub-cutting edge 27 which leads form the other rake surface 28. In other words, the other end of the first ridge line L1 formed on one of the rake surfaces 28, 28 determines the thicknesswise inner end of the sub-cutting edge 27 associated with the other rake surface 28. Thus, the sub-cutting edge 27 associated with the other rake surface 28 is formed on the peripheral edge portion of the second component surface 28B of the first-mentioned rake surface 28.

Similarly, the thicknesswise inner end of the sub-cutting edge 27 connected to the first-mentioned rake surface 28 is defined by the other end of the first ridge line L1 formed on the other rake surface 28, whereby the sub-cutting edge 27 connected to the first-mentioned rake surface 28 is formed on the peripheral edge portion of the second component surface 28B of the other rake surface 28 adjoining the corner edge line 25.

Chamfered portions 30 are formed along the four peripheral edges separate from the main cutting edge 24 among the eight peripheral edges which define both end surfaces 22, 22, i.e., along the peripheral edges which oppose the peripheral edges forming the main cutting edges 24. Each chamfered portion 30 forms obtuse angles between itself and the associated end surface 22 and the side surface 23, and extends from one end of the peripheral edge adjacent to the acute angle corner C to the other end of the same peripheral edge.

Two side surfaces 23, 23 cross each other at the acute angle corner C. The chamfered portion 30 formed on one of these two side surfaces 23, 23 has one end which is adjacent to the acute angle corner C and which is connected to the nose portion 29 of the rake surface 28 of the other side surface 23 so as to intersect the first component surface 28A of this rake surface 28. Similarly, the chamfered portion 30 formed in the other side surface 23 has the above-mentioned one end connected to the nose portion 29 of the other side surface 23 so as to intersect the first component surface 28A of the rake surface 28 of the first-mentioned side surface 23.

The chamfered portion 30 extends along the peripheral edge of the end surface 22 beyond the point of intersection between the peripheral edge and the second ridge line L2 so as to reach an intermediate portion of the portion of the peripheral edge of the side surface 23 between the third component surface 28C and the end surface 22. Furthermore, the chamfered portion 30 progressively decreases its width from the above-mentioned one end adjacent to the acute angle corner C towards the other end.

In these Figures, reference numeral 31 designates a mounting hole which penetrates the body 21 of the cutting insert from one to the other end surfaces 22, 22 so as to receive a clamp screw which is driven for mounting the cutting insert to a cutting tool such as a face milling cutter. The diameter of the mounting hole progressively decreases along the axial length in the thicknesswise direction in conformity of the head portion of the clamp screw to be driven.

As is the case of the known cutting insert described above, the cutting insert of this embodiment is used on a cutting tool such as a face milling cutter as shown in FIG. 15.

The cutting insert is so mounted that one of the two end surfaces 22, 22 is directed outwardly of the cutter body so as to serve as an outer peripheral relief surface, while the other end surface is directed radially inwardly of the cutter body so as to be seated on a seat surface in the cutter body. At the same time, one of the two side surfaces 23, 23 which cross each other at one of the acute angle corners C, C is directed forwardly as viewed in the direction of rotation of the cutter, while the other side surface faces outward of the cutter body, in such a manner that the main cutting edge 24 and sub-cutting edge 27 connected to the rake surface 28 of the above-mentioned one of the side surface 23 project from the outer peripheral surface of the cutter body and the outer end of the same. Thus, similarly to the case of the known cutting insert, the cutting insert of this embodiment, when seated at one of the end surfaces 22, 22, can selectively put into use either one of the main cutting edges 24, 24 on the exposed end surface 22.

In the cutting insert of this embodiment, the rake surface 28 presented on the side surface 23 of the body 21 is a multi-staged surface which is composed of three consecutive component surfaces 28A, 28B and 28C so as to be convex outward is a polygonal form along the periphery of the body 21. Consequently, the main cutting edge 24 on the periphery of the body 21 of the cutting insert also is multi-staged so as to be composed of three main cutting edge sections 24A, 24B and 24C and so as to extend from the end near the nose portion 29 adjacent to the end of the cutter towards the base end of the cutter body in such a manner as to expand to the leading side and then lead to the trailing side as viewed in the direction of rotation of the cutter.

Therefore, when this cutting insert is mounted on the cutter, the axial rake angle of the main cutting edge 24 progressively increases in the positive direction from the end adjacent to the end of the cutter body towards the base end of the same in a stepped manner. In addition, since the third component surface 28C is curved to be convex outward along the circumference of the body 21 of the cutting insert, the portion 24C of the main cutting edge 24 connected to the third component surface 28C also is curved to be convex toward the leading side as viewed in the direction of the cutter rotation. The axial rake angle of this rake surface therefore progressively increases in the positive direction towards the base end of the cutter body.

The component surfaces 28A, 28B and 28C are so arranged to intersect the exposed end surface 22 serving as the outer peripheral relief surface at difference angles $\phi_1$, $\phi_2$ and $\phi_3$ of intersection, and these intersection angles are determined such that the angle $\phi_3$ of the component surface 28C most remote from portion 29 is the smallest and the angle $\phi_1$ of the component surface 28A closest to the nose portion 29 is the greatest. Therefore, the radial rake angle of the main cutting edge 24 so varies as to have a large negative value at the end of the cutter body but increases in a stepped manner to the positive side along the length of the cutting edge 24 towards the base end of the cutter body.

In particular, in this embodiment, the first component surface 28A forms a negative rake surface which orthogonally intersects the end surface 22. Therefore, the cutting edge section 24 near the nose portion 29 can have a nose angle equivalent to that of the known cutting insert, whereas the third component surface 28C is so arranged that the angle $\phi_3$ of intersection with end surface 22 progressively decreases from $\phi_{31}$ at the end 23C$_1$ adjacent to the nose to $\phi_{32}$ at the end 23C$_2$ remote from the nose portion 29. Consequently, the radial rake angle of the main cutting edge 24C progressively increases towards the positive side along the length of this cutting edge towards the base end of the cutter body.

The cutting insert of this embodiment therefore can be designed such that nose angles of the main cutting edge 24A and the sub-cutting edge 27 which lead from the nose portion 29 can be set to large values in the position adjacent the nose portion 29, which portion being disposed at the outer peripheral end of the cutter and receive the greatest load during the cutting. Conversely, at the end near the base end of the body of the cutter, the axial and radial rake angles of the main cutting edge section 24B, 24C are increased in a stepped manner towards the positive side, so as to enhance the cutting effect of the main cutting edge 24. Furthermore, in this embodiment, the third main cutting edge section 24C, which is disposed adjacent to the base end of the cutter and which occupies the greatest portion of the length of the main cutting edge 24, progressively increases its axial and radial rake angles towards the positive side, thus attaining a remarkable improvement in the cutting effect.

Thus, the cutting insert of this embodiment, when subjected to cutting work by being mounted on a cutting tool such as a face milling cutter, exhibits edge strength large enough to withstand the cutting load, while improving the cutting effect over the entire length of the cutting edge. It is thus possible to reduce the cutting resistance to improve the cutting performance, while preventing breakdown of the cutting edge.

As stated before, the main cutting edge 24 is convex outward so as to expand forwardly as viewed in the direction of the cutter rotation beyond an imaginary line which interconnects both longitudinal ends of the main cutting edge 24. Consequently, the main cutting edge is convex also in the radial direction of the cutter body, extending beyond an imaginary line interconnecting both ends of the main cutting edge 24.

Consequently, the locus of the main cutting edge 24 about the axis of rotation of the main cutting edge 24 more closely approximates a true cylindrical surface than the conventional cutting insert having straight main cutting edges. By using the cutting insert of the present invention, therefore, it is possible to attain a greater degree of precision of the surface cut by the main cutting edge 24. It is also possible to uniformly distribute the cutting load along the length of the main cutting edge 24, thus avoiding any local wear which may otherwise occur due to local concentration of the load.

In the invention of this application, the rake surface 28 connected to the main cutting edge 24 also is composed of the three component surfaces 28A, 28B, 28C so as to present a multi-staged convex configuration, such that the rake surface 28 is discontinuous at the aforementioned ridge line L1 and L2. Therefore, the chips of the cut metal, which has been conveyed in close contact with the first component surface 28A leave the rake surface 28 as they moved beyond the first ridge line L1 and chips which have been moved in close contact with the second component surface 28B leave the rake surface 28 as they pass the second ridge line L2.

Thus, according to the invention, it is possible to attain smooth discharge of the cut metal chips and to promote separation of the cut metal chips from the rake surface. Consequently, the cutting resistance is further reduced and unnecessary abrasion of the rake surface by the cut metal chips is avoided to suppress the wear of the rake surface.

Furthermore, in the described embodiment, the third component surface 28C which occupies the greatest portion of the whole rake surface 28 is curved to be convex outward as explained before. Therefore, the metal chips generated as a result of the cutting performed by the main cutting edge section 24C connected to this component surface 28C naturally leaves the rake surface 28 as they move along the component surface 28C.

Thus, the third component surface 28C of the rake surface 28 further promotes the separation of the cut metal chips from the rake surface 28 and enhances the effects to reduce the cutting resistance and to suppress the wear of the rake surface.

In addition, in the cutting insert of this embodiment, the thicknesswise inner end of the sub-cutting edge 27 connected to the rake surface 28 presented by one of two side surfaces 23, 23 which adjoin each other at each acute angle corner C of the body 21 of the cutting insert is determined by the end of the ridge line L1 formed on the rake surface 28 presented by other side surface 23.

Therefore, when the cutting insert is mounted on, for example, a face milling cutter in the manner described above, the second and third component surfaces 28B and 28C of the trailing rake surface 28 as viewed in the direction of cutter rotation serve as a relief surface for the sub-cutting edge 27 presented by the leading rake surface 28 which is used in the cutting work.

Since these consecutive component surfaces 28B and 28C are formed to present a multi-face rake surface portion which is convex outward, the above-mentioned sub-relief surface increases its relief angle in a stepped manner towards the trailing side as viewed in the direction of the cutter rotation, i.e., away from the above-mentioned sub-cutting edge 27. Furthermore, in the described embodiment, the third component surface 28C is curved to be convex outward along the circumference of the body 21 of the cutting insert, the portion of the above-mentioned sub-relief surface presented by the third component surface 28C progressively increases its relief angle towards the trailing side as viewed in the direction of rotation of the cutting tool.

In the cutting insert having the described construction, therefore, it is possible to obtain a sufficiently large relief by increasing its relief angle of the sub-cutting edge 27 towards the trailing side, while preserving required nose angle of the sub-cutting edge 27. Consequently, any unnecessary contact between the sub-relief surface and the sub-cutting edge 27 with the finished surface is avoided to further reduce the cutting resistance.

The body 21 of the cutting insert in the described embodiment has a generally diamond-shaped tabular form, with main cutting edges 24 formed along the peripheral edges of the end surfaces 22, 22 in a staggered or alternating manner. This form of the body 21, however, is only illustrative. For instance, the body 21 may be so designed that one of the two end surfaces 22, 22 is exclusively used as the seating surface which is to be seated on the mounting seat formed on the cutter body. The configuration of the body 21 also may be modified to a form approximating a square or parallelogram and even to a substantially triangular tabular form.

The rake surface 28 presented by the side surface 23, which is constituted by three consecutive component surfaces 28A, 28B, 28C in the described embodiment, also may be modified to have only two component surfaces or four or more component surfaces.

In the described embodiment, only the greatest component surface 28C most remote from the nose portion 29 is curved to be convex outward along the periphery of the body 21 of the cutting insert, so that the third main cutting edge section 24C which occupies the greatest portion of the length of the main cutting edge is curved. This also is only illustrative and the invention does not exclude such modifications that either or both of the remainder component surfaces 28A, 28B also are curved to be convex outward to provide curved main cutting edge section of section 24A, 24B.

As will be understood from the foregoing description, according to the present invention, it is possible to set the axial and radial rake angles of the main cutting edge to large values at the end near the base end of the cutter so as to improve the cutting effect over the entire length of the main cutting edge, while preserving required cutting edge strength at the end of the cutting edge near the end of the cutter where specifically heavy loads act during cutting by preserving required nose angle of the cutting edge. It is therefore possible to reduce the risk of breakdown of the cutting edge and to reduce the cutting resistance, thus improving the cutting performance of the cutting insert.

Furthermore, since the main cutting edge is curved to be convex outward, the locus of rotation of the main cutting edge more closely approximate true cylindrical form. It is therefore possible to improve precision of the finish surface and to prevent local wear of the rake surface. In addition, the cut metal chips are formed in such a manner as to curve in the widthwise direction, which facilitates and promotes separation of the cut metal chips from the rake surface of the cutting insert, thus ensuring smooth disposal of the cut metal chips, as well as reduction in the cutting resistance.

Furthermore, at least one of the component surfaces constituting the rake surface is curved along the circumference of the body of the cutting insert so as to be convex outward, contributing to further improvement in the cutting effect of the main cutting edge and separation of the cut metal chips, thus achieving further reduction in the cutting resistance.

We claim:

1. A cutting insert, comprising: a polygonal tabular body including,
   (a) two opposing end surfaces spaced apart in the thicknesswise direction, (b) side surfaces interconnecting and surrounding said end surfaces,
(c) a main cutting edge formed from at least one peripheral edge between one of said end surfaces and an adjacent one of said side surfaces,
(d) a sub-cutting edge formed from a corner edge line of said body at which said adjacent side surface intersects a second of said side surfaces and which intersects the peripheral edge where said main cutting edge is formed, said sub-cutting edge is connected to said main cutting edge so as to form a nose portion therebetween, and
(e) a rake surface formed by said adjacent side surface, and defined by said corner edge line where said sub-cutting edge is formed and by said at least one peripheral edge where said main cutting edge is formed, wherein said rake surface has a plurality of consecutive component surfaces demarcated by edge lines, each of which at one end thereof reaches said main cutting edge, so as to present a multi-face surface which is curved along said body so as to be convex outward, and further wherein intersection angles at which said component surfaces intersect said one of said end surfaces having said main cutting edge are varied in a stepped manner that the component surface most remote from said nose portion has the smallest intersection angle and the component surface closest to said nose portion has the greatest intersection angle, wherein said component surface most remote from said nose portion is curved along the circumference of said body so as to be convex outward and wherein said intersection angle of said component surface most remote from said nose portion variably decreases towards the direction more remote from said nose portion, and wherein said intersection angle of said component surface closest to said nose portion is substantially constant over the length thereof.

2. A cutting insert according to claim 1, wherein an other end, opposite said one end, of at least one of said ridge lines demarcating adjacent component surfaces of said rake surface is extended to reach said corner edge line where said two adjacent side surfaces intersect each other.

3. A cutting insert according to claim 2, wherein, among the peripheral ridges defining said two end surfaces, a pair of ridge lines which are connected to said corner edge line where said two adjacent side surfaces intersect each other and which are on alternating end surfaces as viewed in the circumference direction of said body are formed to have said main cutting edges, said corner edge line being formed to have said sub-cutting edge extending inwardly in the thicknesswise direction from each main cutting edge, each of said two side surfaces intersecting each other at said corner edge line presenting said rake surface, and wherein the other end of said ridge line, demarcating adjacent component surfaces of one of said rake surfaces, extends to reach said corner edge line at which said side surfaces intersect each other, defining the thicknesswise inner end of said sub-cutting edge leading from the other of the rake surface, at least one of the component surfaces one of said rake surfaces serving as a relief surface connected to said sub-cutting edge associated with the other of said rake surfaces.

4. A cutting insert according to claim 3, wherein said plurality of component surfaces includes a first component surface connected to said nose portion and a second component surface connected at a first ridge line to said first component surface, said first ridge line extending to reach said corner edge line where said two side surfaces intersect each other, said second component surface of said first rake surface serving as a relief surface connected to said sub-cutting edge associated with the other of said rake surfaces.

5. A cutting insert according to any one of claims 1, 2, 3 and 4, wherein said first component surface connected to said nose portion is a negative rake surface which orthogonally intersects said end surface connected to said main cutting edge.

6. A cutting insert according to claim 1, wherein said component surface closest to said nose portion is substantially planar.

7. A cutting insert according to claim 1, wherein there are three said component surfaces, and wherein said component surface closest to said nose portion is substantially planar, and wherein the component surface adjacent said component surface closest to said nose portion is also substantially planar.

* * * * *